Feb. 2, 1960

G. EZBELENT

2,923,447

PLEATING MACHINE

Filed Oct. 7, 1957

United States Patent Office 2,923,447
Patented Feb. 2, 1960

2,923,447

PLEATING MACHINE

Georges Ezbelent, Paris, France

Application October 7, 1957, Serial No. 688,759

Claims priority, application France April 27, 1957

20 Claims. (Cl. 223—30)

The present invention relates to the pleating of an article of rectangular or like-shaped piece of cloth or any other foldable material and more particularly, to the obtainment of conical or sun pleating in which each pleat has in plan a triangular or trapezoidal shape, its width diminishing from one end to the other.

Such pleating has heretofore been obtained by placing the article between two flattened-out previously-pleated sheets of cardboard. The assembly is pleated along the pleat lines of the two sheets and then put in a hot press.

An automatic type of pleating machine is known, comprising a comb-carrying gripping device, to which are imparted alternating movements of adjustable amplitude forming successive loops in the object to be pleated, and rotating rolls which draw on or drive and press these loops so as to obtain fold lines. These high-output machines only permit obtaining pleats of a constant width, that is pleats having parallel fold lines, to the exclusion of any conical or sun pleating.

The object of the invention is to provide a pleating machine of the aforementioned type, improved in such manner as to permit obtaining conical pleating.

This machine is characterized in that at least one of its driving and pressing rolls is mounted for swinging movement about a fixed centre disposed on the axis of the roll, whereby in the course of the swinging movements said axis assumes an inclination relative to the combs while remaining parallel with the common tangent plane of the two rolls.

According to another feature of the invention, at least one of the rolls is mounted in such manner that these rolls are capable of being separated and said rolls are combined with two actuating devices which are so adapted that at predetermined moments of a pleating cycle before rotation of the rolls, one of said devices swings the swingable roll about said centre and the other device separates the two rolls, the swinging movement of the swingable roll in one direction occurring when the rolls are separated whereas the swinging movement in the other direction occurs when the rolls are in contact.

In one embodiment of the invention, one of the rolls is so mounted that its axis is capable, on the one hand, of swinging about a centre which substantially coincides with the centre of one of the bearings, and, on the other hand, of moving in vertical translation under the effect of said two actuating devices, on the one hand, in a direction parallel with the tangent plane of the rolls and, on the other hand, in a direction perpendicular to said tangent plane (which results in separation of the rolls), whereby each point of the axis of said roll describes a closed path having a substantially rectangular shape.

The other roll may be mounted in the same manner as the first roll, or have a fixed axis.

The invention permits obtaining conical pleating of any desired angle and width in any article and in particular in bands having parallel edges which are automatically fed into the machine in a direction parallel with said edges.

Another object of the invention is to provide articles in which have been formed conical pleatings obtained by means of the machine of the invention.

Further features and advantages of the invention will be apparent from the ensuing description with reference to the accompanying drawings, to which the invention is in no way limited.

In the drawings:

Figs. 25 to 28 are plan views on an enlarged scale corresponding to Figs. 18, 20, 21 and 24 respectively;

Figure 1:
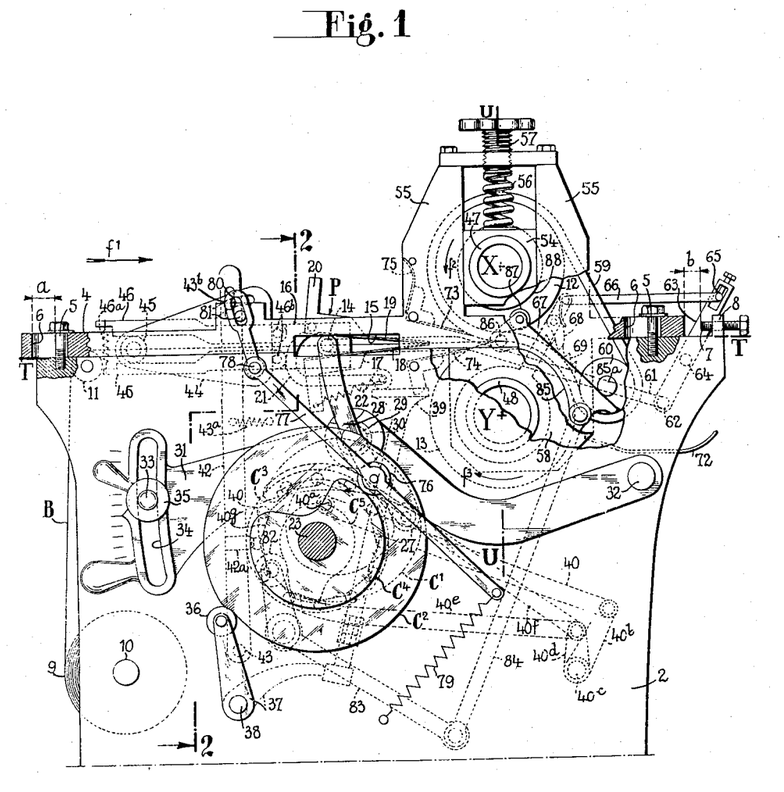
Fig. 1 is a side elevational view, with parts cut away, of a pleating machine embodying the invention of the type comprising two movable rolls.

In the ensuing description, the direction of movement of the articles to be pleated, indicated by arrow $f^1$ in Fig. 1, will be termed the forward direction.

Figure 2:
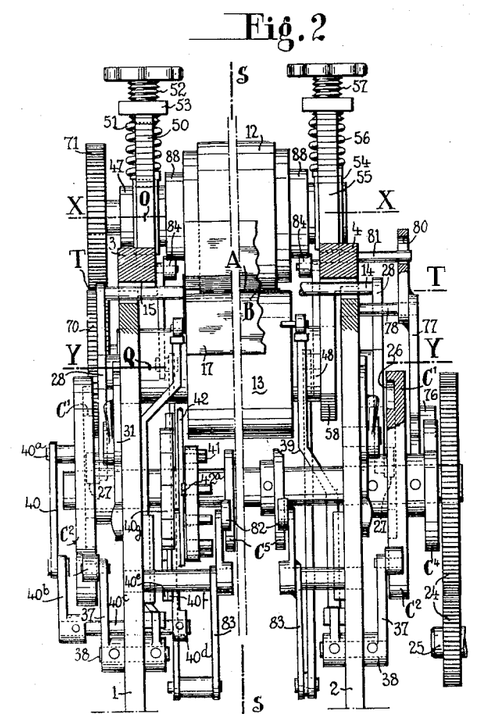
Fig. 2 is a vertical cross-sectional view taken along line 2—2 of Fig. 1, with parts cut away.

In the embodiment shown in Figs. 1 and 2, the pleating machine is of the known type comprising a stand having two side members 1 and 2 which are vertical and parallel with the vertical longitudinal plane of symmetry SS. These two side members are suitably braced and carry on their upper horizontal edges two longitudinal supports 3 and 4.

The support 3 is, for example, rigidly secured to the member 1 as in machines of known type. On the other hand, the support 4 is, according to the present invention, mounted on the member 2 for movement in longitudinal translation. This support 4 is retained by retaining and stop screws 5 (Fig. 1) extending through elongated apertures 6. These stop screws or abutments determine the forward position of the support 4 the apertures 6 providing a longitudinal clearance $a$ (Fig. 1) which corresponds to the maximum desired rearward travel of the support 4. This travel may be reduced and even eliminated by means of an adjustable abutment or stop screw 7 which is screw-threadedly engaged in a lug 8 formed on the side member 2 (Fig. 1). The actuating device adapted to impart to the support 4 its alternating longitudinal movements will be described hereinafter with the other new devices incorporated, in accordance with the invention, in the pleating machine of known type.

Before describing these new devices, mention will be made of the unmodified parts of the machine adapted to co-operate with these new devices in accordance with a pre-determined cycle.

This machine comprises therefore, as known per se:

(a) A gripping device P adapted to feed the article A to be pleated in the forward direction $f^1$ a distance determined by the adjustable travel of this gripping device.

(b) A support B formed by a sheet of paper or similar material which is unwound from a reel 9 having journals 10 journalled in the side members 1 and 2, passes round a roller 11 and thereafter forms a horizontal support sheet contained in a plane TT.

(c) An upper roll 12 and a lower roll 13 disposed forwardly of said gripping device P and rotatably mounted in the supports 3 and 4.

The gripping device P, which is of the conventional type, comprises two parallel plates 16 which are fixed on two horizontal journals 14 capable of moving in two apertures 15 formed between the side members 1 and 2 and the supports 3 and 4 and are rigidly interconnected by a lower comb-carrier 17 which is extended by a first comb 18 adapted to form one of the flexible jaws of the gripping device; the other jaw of the latter is formed by an upper comb 19 fixed on a support 20 which is pivotably mounted on the two plates 16 and is connected to two arms 12 which participate in its pivotal movements. These arms are urged by springs 22 which connect them to the support 17 and tend to close the jaws of the gripping device.

This gripping device P is capable of undergoing three types of movements: a forward and backward alternating movement; opening and closing movements; rocking movements caused by rocking of the plates 16 about the axes of the journals 14.

The longitudinal alternating movements of the gripping device are adjustable in such manner that the forward extreme position is fixed and the rear extreme position is variable. These longitudinal movements are obtained by the action of two coupled cams $C^1$ keyed to a shaft 23 which is journalled in the members 1 and 2, and is connected by a transmission 24 to a driving shaft 25. Each cam comprises a recess 26 in which is engaged a roller 27 carried at one end of a lever 28 which is pivotably mounted at its other end on the corresponding journal 14. Each lever 28 is engaged in a slidable journal 29 which is adjustable along the lever for regulating the mechanical advantage. This journal 29 is journalled at 30 in an adjusting lever 31 which is pivotably mounted at 32 on the side member 1 or 2 and held in adjustable position by a screw-threaded stud, which is carried by the corresponding side member and extends through an arcuate elongated aperture 34, and a clamping nut 35 screw-threadedly engaged on this stud.

The opening and closing movements of the gripping device P are obtained by means of the peripheries $C^2$ of the cam $C^1$, these peripheries $C^2$ engaging through the medium of rollers 36 two levers 37 journalled at 38 in the side members of the stand and each actuating a push member 39 which permits pivoting upwardly the arm 21, rigidly secured to the upper jaw of the gripping device, in the direction to open the latter in opposition to the action of the spring 22.

The pivoting movements of the gripping device about the journals 14 are obtained by means of a cam plate $C^3$ mounted on the shaft 23 about which it is capable of rotating intermittently a pre-determined distance under the effect of a link 40 rotatably mounted at $40^a$ on an eccentric journal, for example, carried by one of the cams $C^1$. The link 40 is connected by a crank $40^b$ to a shaft $40^c$ which actuates through another crank $40^d$ two pawls $40^e$ and $40^f$ which co-operate with a ratchet wheel $40^g$ which is connected to the cam plate $C^3$ for rotational movement therewith. For each full revolution of the shaft, the cam plate $C^3$ is therefore driven $$\frac{1}{n}$$

revolution in two fractions of a revolution of $$\frac{1}{2n}$$

each. In the presently-described example $n=12$. Movable on the plate $C^3$ in the direction parallel with the axis, are $n$ studs 41 which, according to their longitudinal position, protrude from or do not protrude from the left side or face of this plate (Fig. 2). Each protruding rod in one or the other of the successive stop positions $$\left(\text{displaced } \frac{1}{2n}\right)$$

of the plate $C^3$, encounters a finger $42^a$ provided on a lever 42 which is mounted for pivotal movement about a pin 43 and pivots this finger toward the left (Fig. 1), in opposition to the action of a spring $43^a$. In so pivoting, this lever 42 drives, through the medium of a sliding pin $43^b$, a triangular sector 44 which is pivotably mounted on a shaft 78 and carries a roller 45. The latter actuates two levers 46 which are interconnected by a spring $46^a$ and are journalled at $46^b$ in one of the plates 16 of the gripping device P. The arrangement is such that when the finger $41^a$ is disposed between two studs 41, the gripping device P is downwardly inclined, whereas it is raised when a stud encounters the finger.

The rolls 12 and 13 are carried by two shafts 47, 48 which are preferably hollow to permit supply of heat. These shafts, which have horizontal and transverse axes XX and YY ordinarily located in a vertical transverse plane UU, are rotatably mounted at their left end (as viewed in Fig. 2) on the side member 1 and on the fixed support 3 respectively. The shaft 48 is directly journalled in the side member 1, whereas the shaft 47 is journalled in a bearing 49 which is slidably mounted between two guides 50 carried by the support 3 (Fig. 2). A spring 51 which is adjustable by means of a screw 52, screw-threadedly engaged in a transverse member 53, permits adjusting the pressure exerted by the corresponding end of the roll 12 on the roll 13.

When they are in contact, these rolls have a common tangent plane coinciding with the plane TT in which the article A (carried by the support B) moves in a forward direction from the input end of the machine and thence between the rolls.

At their other ends, the shafts 47 and 48 are mounted in a novel manner.

In the conventional method of mounting, the shaft 47 of the roll 12 is journalled in a support member which is similar to the member 4 but is permanently secured to the side member 2, and the shaft 48 of the lower roll 13 is directly journalled in this side member, 2. The arrangement according to the invention is as follows:

(a) The two shafts are carried by the support 4 which is capable of sliding along the member 2.

(b) The upper shaft 47 is journalled in a bearing 54 which is slidable between two uprights 55 rigidly secured to the support 4 and is urged downwardly by a spring 56 adjustable by means of a screw 57.

(c) The shaft 48 is journalled in a depending portion 58 which forms part of the same material as, or is rigidly secured to, the sliding support 4, so that the end of the roll 13 participates in the alternating longitudinal movements of the support 4 in the same manner as the corresponding end of the roll 12.

The machine further comprises other conventional devices such as:

(a) A band of felt 59 which surrounds a part of the upper roll 12 and has such length as to form on the output side of the roll a loop tensioned by a freely movable counterweight 60. Owing to the action of the counterweight 60, a lower portion of the loop surrounds part of the upper portion of the lower roll 13 on the output side of the latter for the purpose of pressing for a certain period of time the previously formed and heated pleats.

(b) A device for driving the rolls 12 and 13 in the direction of arrows $f^2$ and $f^3$ respectively, when the gripping device P reaches the end of its return rearward travel toward the left as viewed in Fig. 1. This device, which has been shown only in Fig. 1 and omitted from Fig. 2 for the sake of clarity, would be positioned on the left side of Fig. 2 outside the side members. The device comprises a link 61 pivoted at one end to the corresponding journal of the gripping device P and pivoted at its other end 62 to a lever 63 pivoted at 64 to the side member 1. A link 66 is pivoted to the lever 63 at 65 and connects the lever 63 to another lever 67 which is rotatably mounted on the corresponding end of the shaft 48 of the lower roll 13 and carries a pawl 68 which co-operates with a ratchet wheel 69 keyed to the shaft 48. The arrangement is such that this shaft, and in consequence the roll 13, is driven in the direction of arrow $f^3$ when the gripping device P moves rearwardly toward the input side of the machine; the intermittent rotational movements thus imparted to the roll 13 are transmitted to the roll 12 in the direction of arrow $f^2$ by two gears 70 and 71 keyed to the shafts 48 and 49 respectively.

(c) A metal sheet 72 which is positioned on the output side of the machine between the two side members 1 and 2 below the loop formed by the felt band 59, and receives the finished pleated article.

(d) Two convergent counter-combs 73 and 74 disposed on the input side of the rolls 12 and 13. One comb is urged against the roll 12 by a spring 75 whereas the other is urged against the roll 13 by the action of its own weight.

The arrangement just described, which is of known type apart from the sliding support 4 and the particular mounting of the rolls 12 and 13 in this sliding support, is improved in accordance with the invention by the following features:

(a) The shafts 47 and 48 have such play in their bearings as to permit the axes XX and YY of the two rolls to swing in the horizontal planes containing these axes. It will be observed that this play or clearance is in fact very small, since the swinging movements are not very great, namely from about a few millimetres to a few centimetres, where as the length of the rolls is generally about 2 metres.

(b) Two devices are provided which are synchronized with the aforementioned cams $C^1$ and $C^3$ for, on the one hand, imparting a longitudinal alternating movement to the support 4 so as to swing the axes XX and YY in horizontal planes about pivot centres O, Q situated substantially in the centre of the two bearings carried by the support 3 and the side member 1, and, on the other hand, moving the axis XX of the roll 12 in translation and thus moving this roll in the vertical transverse plane UU (Fig. 1).

The first actuating device comprises a single cam $C^4$ keyed to the shaft 23 and co-operating by way of a roller 76 with a lever 77 pivotably mounted on a journal 78 carried by the side member 2. This lever is biased by a spring 79 which holds the roller 76 against the cam $C^4$. The upper end of the lever comprises an elongated aperture 80 in which is engaged a pin 81 fixed to the support 4. The longitudinal position of the latter therefore depends on the contour of the cam $C^4$.

The second actuating device, adapted to impart vertical movements of translation to the roll 12, comprises two twin cams $C^5$ keyed to the shaft 23 and co-operating through the medium of two rollers 82 with two levers 83 having two arms which links 84 connect to two levers 85 which are arcuate to avoid the shaft 48 of the roll 14. These levers 85, which bear against the ends of shouldered journals $85^a$ of the counterweight roller 60 tensioning the felt band 59, are pivotably mounted on journals 86 (Fig. 1) provided on the supports 3 and 4. They carry two rollers 87 positioned to move upwardly against cylindrical bearing surfaces 88 provided on the shaft 47 of the upper roll 12. Thus, when the links 84 pivot the levers 85 in the counterclockwise direction about their journals 86, these levers raise simultaneously: on the one hand, the felt band 59, through the medium of the roller 60 so as to move this felt band a sufficient distance away from the roll 13 and thus release the pleated part of the article engaged between the roll and the felt band, and, on the other hand, the shaft 47, thus causing the latter and the roll 12 to move upwardly away from the tangent plane TT.

Figure 3:
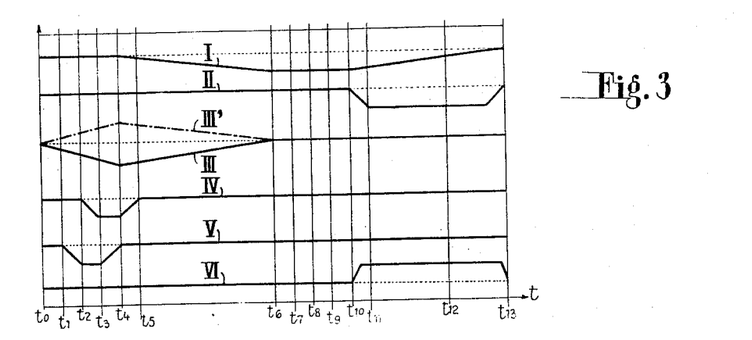
Fig. 3 is a time-displacement diagram of the cams of the machine shown in Figs. 1 and 2.

Fig. 3 shows the time and displacement diagrams of the aforementioned cams $C^1$ to $C^5$ in the form of curves I to V and, at VI, the period of rotation of the rolls 12 and 13. The times $t$ have been plotted as abscissae.

The ordinates of the various curves represent the lifts and falls of the cams; the actual values thereof have not been shown in correct scale to simplify the plotting of the diagram.

Before the start of the pleating operation, the machine is adjusted, that it to say, the screw 7 carried at the end of the side member 2 (Fig. 1) is screwed or unscrewed so as to adjust to a given value $b$, not exceeding the clearance $a$ permitted by the elongated apertures 6, the longitudinal travel of the sliding support 4 and thereby determine the conicity of the pleating, that is the convergence of the pleat lines.

Figure 4:
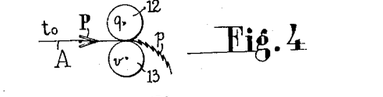
Figs. 4 to 10 are diagrams representing in vertical section the various stages of a pleating cycle of the invention.
Figure 5:
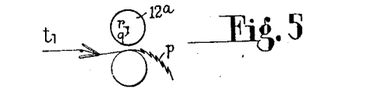
Figure 11:
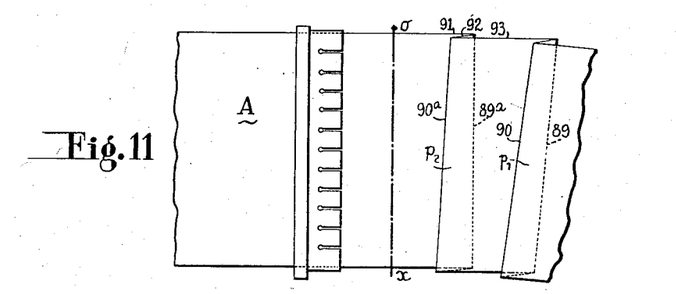
Figs. 11 to 14 are plan views on an enlarged scale, corresponding to Figs. 4, 7, 9 and 10.

Let it be assumed that at time $t^0$, at the start of the formation of a pleat, the work A already comprises a number of formed pleats which have passed between the two rolls 12 and 13. The machine is in the position shown in Figs. 1 and 2 and the article is in the position shown in Figs. 4 and 11. Fig. 11 shows the two last preceding pleats $p^1$ and $p^2$. Each pleat comprises three layers of fabric 91, 92 and 93 which are pleated in zig-zag manner and are interconnected by two fold lines 89, 90 and $89^a$, $90^a$. The layer 91 of the pleat $p^2$ is connected to the part of the article which is not yet pleated whereas the layer 93 is connected to the already pleated part. In each pleat the two fold lines are convergent and from one pleat to the following pleat the fold lines 39 and $89^a$ are convergent, as are the lines 90 and $90^a$.

At time $t^0$ the gripping device P is in its extreme rear position and is adjusted by positioning the journal 29 by means of the lever 31. This gripping device is closed by the spring 22 and its median plane coincides with the plane TT. Further, the rolls are held stationary; they are in contact in this tangent plane and their axes of rotation are situated in the plane UU. Gripped between these two rolls are the felt band 59 and the portion of the article adjacent the layer 91 of the last pleat $p^2$ that has been formed (Fig. 11). In Fig. 11 the line $ox$ represents both the projection in plan of the axis XX of the roll 12 of the centre O of the swinging movement of the roll and the line of contact of the two rolls.

Right from the start of the cycle, the cam $C^3$ causes a progressive downward tilting of the gripping device P (compare the positions shown in Figs. 4 to 7); maximum inclination is reached at time $t^4$.

At time $t^1$, the cams $C^5$ cause the upper roll 12 to rise to $12^a$ (Fig. 5), the centre of the right end of the roll (as viewed in Fig. 2) disposed on the axis XX rises from point $q$ to the point $r$. At the same time, the felt band 59 is raised equally over its entire width.

Figure 6:
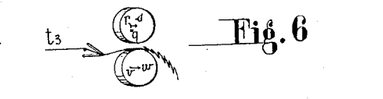

Then, at time $t^2$, the cam $C^4$ starts to move the sliding support 4 forwardly in the direction of arrow $f^1$, which causes the axes of the two rolls to swing forwardly about their respective centres O and Q toward the output side of the machine, the swinging movements terminating at time $t^3$ whereupon the rolls are in the position shown in Fig. 6. The centre of the right end of the roll 12 moves from $r$ to $s$, whereas the centre of the right end of the lower roll 13 moves from $v$ to $w$. The axis YY has swung exactly in a horizontal plane parallel with the plane TT in a similar manner to the axis XX. The felt band 59 also swings forwardly with the roll 12.

Figure 12:
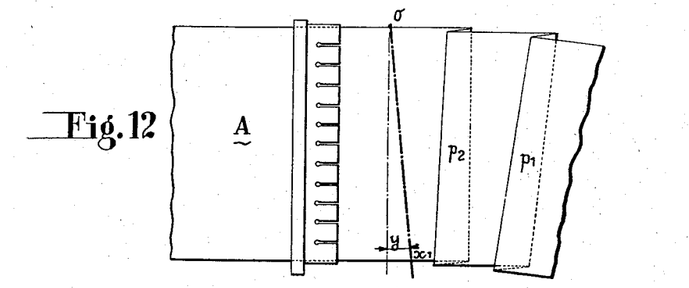

Fig. 12 shows at $ox^1$ the positions assumed in the plane of the article by the generatrices of the rolls, the latter having swung horizontally through an angle $y$ corresponding to the setting of the travel or stroke $b$ of the sliding support 4.

Figure 9:
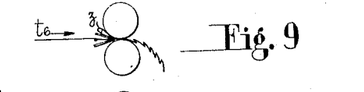

Meanwhile, at time $t^4$, the gripping device which is still closed and has reached its maximum downward inclination, starts to move forwardly and reaches the extreme forward position at time $t^6$ (Fig. 9). Between these two positions this gripping device moves the unpleated part of the article with a movement of longitudinal translation and produces a loop $z$ which, in the absence of any movement of the rolls, would have a constant length and would produce pleating having parallel fold lines.

Figure 7:
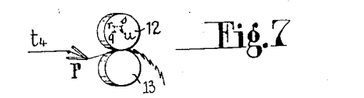

But, from time $t^3$ (Fig. 6) to time $t^4$ (Fig. 7), the cam $C^5$ allows the upper roll 12 to descend so as to once more come into contact with the roll 13 in their oblique positions shown in Fig. 7; the centre $q$ is now in position $u$.

Figure 8:
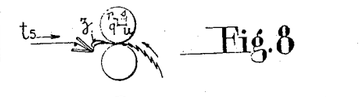
Figure 13:
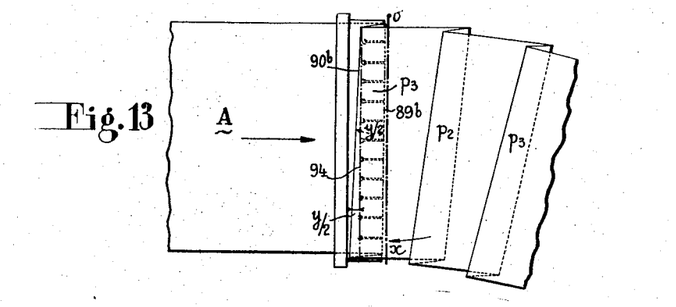

From time $t^4$ to time $t^5$, the cam $C^4$ returns the support 4 to its extreme rearward position and the axes of the two rolls swing rearwardly about the centres O and Q through an angle equal to $y$ so that the centre of the end of the roller 12 returns from position $u$ to the original position $q$ (Fig. 8) and thus terminates a movement through a path in the form of a parallelogram $qrsu$, whereas the line of contact between the two rolls resumes (Fig. 13) the initial direction $ox$ it had at the start (Fig. 11).

In the course of the rearward swinging movements of the two rolls 12 and 13, the latter, which grip the article at the rear of the last pleat $p^2$ formed, shift rearwardly not only the portion of the gripped work but also the whole series of preceding pleats which are held against the roll 13 by the felt band 69 which participates in the movement, and all this part of the article swings about the centre O and undergoes a circular translation in the horizontal plane.

As a result of this movement, the line $90^b$ pertaining to the new pleat $p^3$ in the course of execution (Fig. 13) assumes, relative to the dot-dash line 94, which would correspond to a straight pleat obtained solely with the combs, an inclination $y/2$ which is finally obtained between the two fold lines $89^b$ and $90^b$ in the new pleat $p^3$. The latter is the desired conical pleating, the angle $y/2$ of which is obtained by suitably choosing the travel $b$ of the movable support 4.

Figure 10:
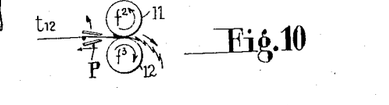

Meanwhile, at time $t^{10}$, the gripping device P starts to move away from the rolls under the effect of the cam $C^1$ while it opens under the effect of the periphery $C^2$ of the cams $C^1$ from time $t^{10}$ to time $t^{11}$ and, simultaneously, under the effect of the lever connecting mechanism 61—69 the two rolls rotate in the direction of arrows $f^2$ and $f^3$ (Fig. 1). Fig. 10 shows the unit at an intermediate time such as $t^{12}$.

Figure 14:
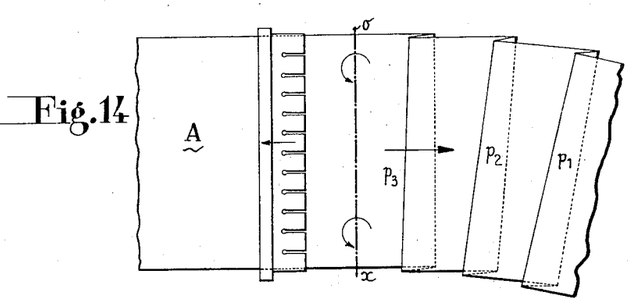

At time $t^{13}$, the cycle is terminated, the gripping device P stops and closes and simultaneously the rolls 12 and 13 cease to rotate. These rolls press the pleat $p^3$ which assumes the position that the pleat $p^2$ formally assumed forward of the line of contact $ox$ (Fig. 14).

A new cycle forming the next pleating now commences.

In the course of prior adjustment of the abutment screw 7, that is, the travel $b$ of the support 4, in the extreme case this support could be blocked in its extreme rearward position so that the cam $C^4$, having only a unidirectional contact, is inoperative; these rolls no longer undergo a swinging movement and the pleating obtained is straight or parallel.

The transverse dimensions of the pleats can also be modified by moving the levers 31 and, by means of the set of retractable studs or projections 41 carried by the cam plate $C^3$, it is possible to determine the direction of the pleats.

Figure 15:
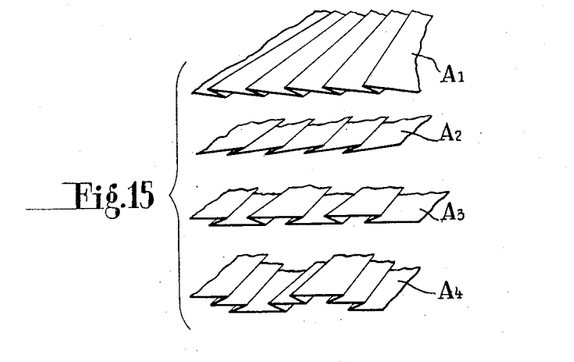
Fig. 15 shows diagrammatically, by way of example, some types of pleating obtainable with the machine of the invention.

The gripping device P can be caused to point upwardly, corresponding to the dot-dash line III' in Fig. 3, thereby obtaining the flat pleating $A^2$ shown in Fig. 15, whereas the curve III provides the flat pleating $A^1$.

It is of course possible to combine the two types of pleating and obtain, for example, the "Watteau" pleating shown at $A^3$ in Fig. 15 or the double "Watteau" pleating $A^4$ or any other desired pleat arrangement.

The machine has therefore a very great adaptability since it permits obtaining any type of pleating.

Figures 16, 18, 19, 20, 22, 23, 24:
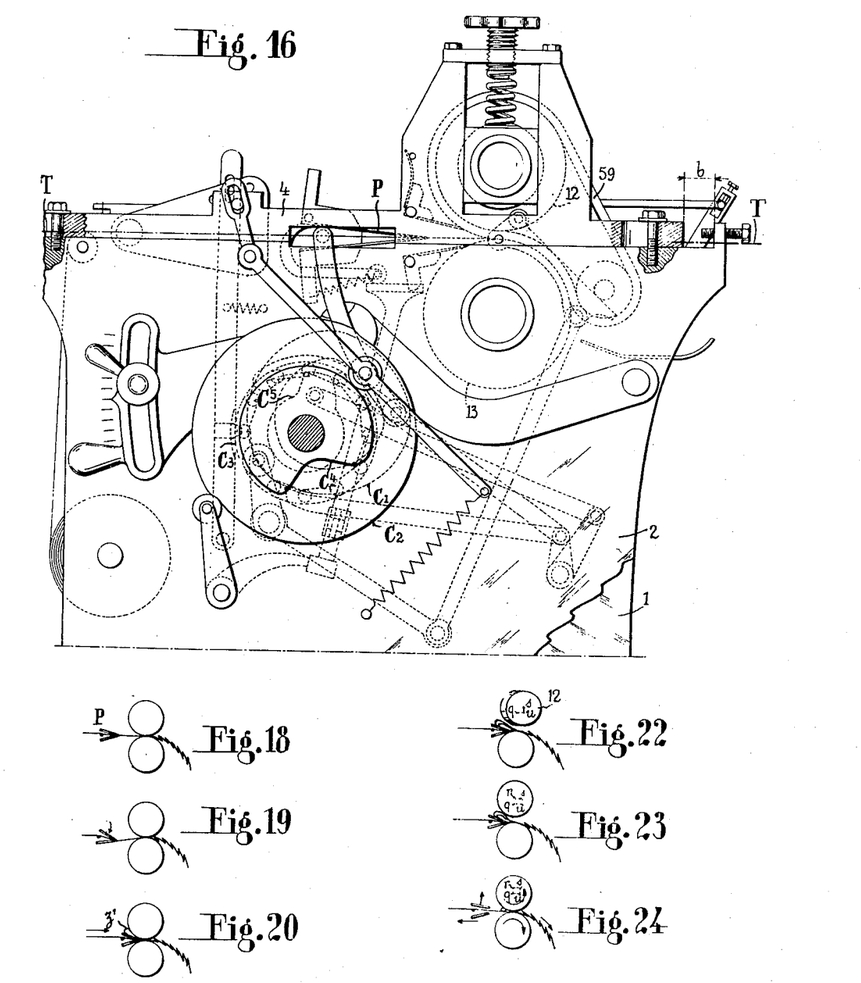
Fig. 16 is a side elevational view, similar to Fig. 1, of a modification of the machine in which only the upper roll is movable.
Figs. 18 to 24 are diagrams similar to Figs. 4 to 10 and representing in vertical section the various stages of pleat formation.

Fig. 16 shows a modification of the machine in which all the devices of the machine described hereinbefore are incorporated. However, the lower roll 13 does not participate in the swinging movements of the upper roll in the direction parallel with the tangent plane TT. This roll 13 is journalled directly in the two side members 1 and 2.

Figure 17:
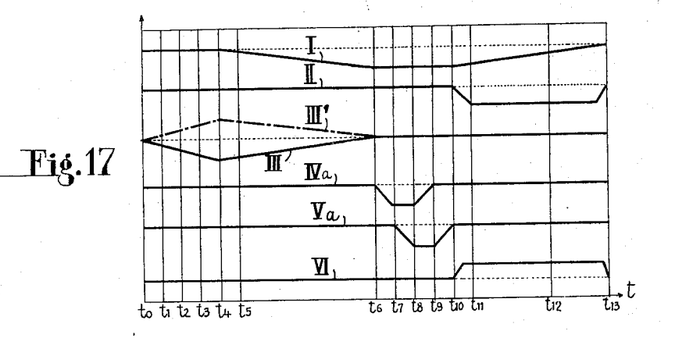
Fig. 17 is a corresponding time chart.

Further, although the cams $C^1$, $C^2$ and the cam plate $C^3$ pertaining to the gripping device P have the same settings as those in the foregoing embodiment (see the curves I, II, III and IV of the diagram shown in Fig. 17), the cams $C^4$ and $C^5$ are displaced about 180° relative to their positions in the foregoing embodiment (see the curves $IV^a$ and $V^a$ of the diagram shown in Fig. 17). The operational cycle is therefore modified.

Figures 25, 26, 27, 30, 31, 32, 33, 34:
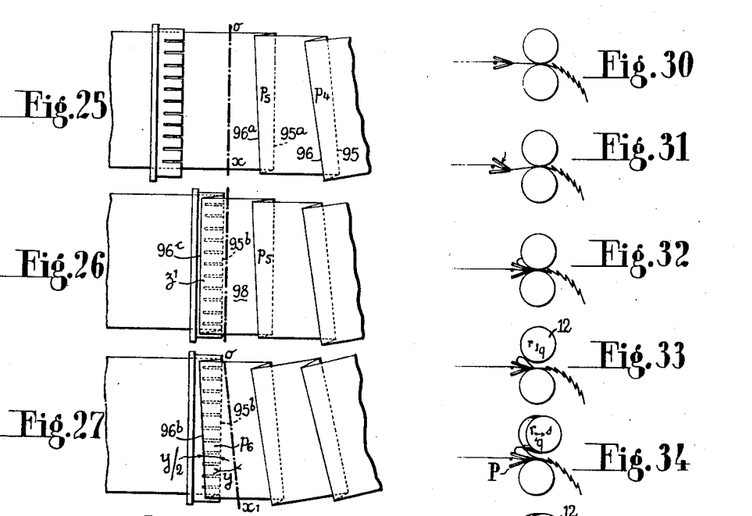

In Figs. 18 and 25, which correspond to time $t^0$, $p^4$ and $p^5$ represent the two last pleats formed with their fold lines respectively 95 and 96—$95^a$ and $96^a$ downwardly convergent, whereas the fold lines 96 and $96^a$ relating to the two consecutive pleats upwardly converge. The line of contact of the two rolls is still the dot-dash line $ox$, and the gripping device P is in its extreme rear position.

From time $t^0$ to time $t^4$, the gripping device P is tilted and passes from the position shown in Fig. 18 to that shown in Fig. 19.

Then from time $t^4$ to $t^6$ this gripping device moves forwardly and passes from the position shown in Fig. 19 to that shown in Fig. 20, and it forms a loop $z^1$ which can be seen in Fig. 26. This loop has a constant width, the two fold lines $95^b$ and $96^c$ being parallel.

Figure 21:
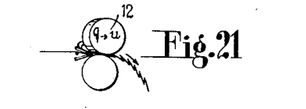

From time $t^6$ to time $t^7$, the cam $C^4$ swings the upper roll 12 in a horizontal plane so that the centre of its right end (as viewed in Fig. 2) passes from $q$ to $u$ (Fig. 21) and entrains therewith in a movement of circular translation the layer 98 of the fabric which connects the preceding pleat $p^5$ to the pleat in course of formation.

The series of previously formed pleats does not hinder this movement because the band 59 moved forwardly with the roll 12. The lower generatrix of the roll finally swings to $ox^1$ at an angle $y$, the value of which depends on the setting of the travel $b$ of the support 4. Owing to the driving of the portion 98 of the article, the fold line $96^c$ shown in Fig. 26 is inclined at $96^d$ (Fig. 27) and thus provides the desired conical pleating $p^6$ whose two fold lines $95^b$ and $96^b$ converge and form therebetween an angle $y/2$.

Meanwhile, from time $t^7$ to time $t^8$, the cams $C^5$ raise the roll 12, the centre $q$ passing from $u$ to $s$. Then from time $t^8$ to time $t^9$, the cam $C^4$ swings the roll 12 rearwardly, the roll still being in its raised position so that the centre $q$ passes from $s$ to $r$.

During this movement, as the two rolls are not in contact the pleat $p^6$ which had been formed is not displaced.

Then from time $t^9$ to time $t^{10}$, the upper roll 12 is lowered and the aforementioned centre $q$ passes from $r$ to $q$ so that this centre has finally travelled through a path in the form of a parallelogram $qrsu$, that is, the same parallelogram as that described in the first embodiment, except that the movement is in the opposite direction, the operative part corresponding to the travel $qu$ whereas in the first embodiment the operative part was the return travel $uq$.

Figures 28, 35, 36:
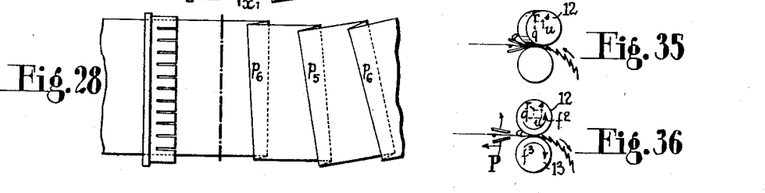

Finally, the cycle terminates, as in the first embodiment, in the rearward movement of the gripping device P from time $t^{10}$ to time $t^{13}$, its opening from time $t^{10}$ to time $t^{11}$ and the rotation of the rolls from time $t^{10}$ to time $t^{13}$ with the passage of the pleat $p^6$ formed forwardly through the line $ox$, that is, from its position shown in Fig. 27 to that shown in Fig. 28.

Figure 29:
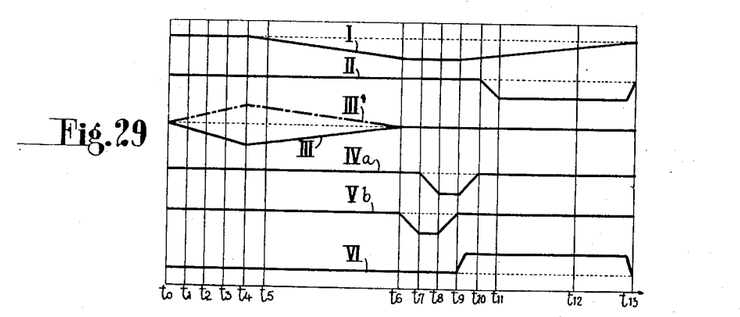
Fig. 29 is a time-displacement diagram of a second modification of the machine, which, apart from the cam settings, is identical to the machine shown in Fig. 16, and Figs. 30 to 36 are diagrams similar to Figs. 18 to 24 representing in vertical section the various stages of the formation of a pleat with this second modification of the machine.

The machine shown in Fig. 16, that is, the type of machine in which the lower roll is fixed whereas the upper roll is swingable in the horizontal plane and movable in translation in the vertical direction owing to the action of the cams $C^4$ and $C^5$, permits another operational cycle by means of a different setting of the cams provided by the diagram shown in Fig. 29.

The curves I, II, III, IV, pertaining to the gripping device P and the rotation of the rolls, remain unmodified. On the other hand, the curve $IV^a$ is displaced from $t^6$ to $t^7$, and the action of the cams $C^5$ corresponding to the raising of the upper roll is slightly displaced toward the start of the cycle (compare the curves $V^a$ and $V^b$ shown in Figs. 17 and 29). Under these conditions, the cycle obtained is that shown in Figs. 30 to 36. This cycle is identical to the preceding cycle up to the position shown in Fig. 32, which corresponds to time $t^6$.

From time $t^6$ to time $t^7$, the upper roll is raised by the actoin of the cams $C^5$, the centre $q$ describing the straight line $qr$ as in the first embodiment, then from time $t^7$ to time $t^8$ the cam $C^4$ swings the roll forwardly, the centre $q$ passing from $r$ to $s$. During this movement, the roll has no action on the loop having parallel fold lines obtained by means of the gripping device P as in the preceding embodiment.

From time $t^8$ to time $t^9$, the roll 12 is lowered by the action of the cam $C^5$ the centre $q$ passing from $s$ to $u$.

From time $t^9$ to time $t^{13}$, the gripping device P moves rearwardly and the rolls 12 and 13 are rotated in the direction of arrows $f^2$ and $f^3$, but between times $t^9$ and $t^{10}$ the upper roll 12 swings rearwardly so that the centre $q$ passes from $u$ to $q$.

As the roll rotates during this rearward return movement, it acts on the loop having parallel fold lines obtained by means of the gripping device when the latter reached the position shown in Fig. 33. Owing to this rotation, there is obtained a circular movement of translation of the portion of fabric connecting the parallel folds loop to the preceding pleat and there is obtained the desired inclination of the two fold lines of this loop. Then, from time $t^{11}$ to time $t^{13}$, the rolls continue their rotation in their rearward position and the conical pleating obtained is compressed and passes forwardly through the rolls and out of the machine with the rest of the pleated part of the article.

Although specific embodiments of the invention have been described, many modifications and changes may be made therein without departing from the scope of the invention as defined in the appended claims.

Having now described my invention what I claim as new and desire to secure by Letters Patent is:

1. In a machine for pleating an article of pleatable material such as fabric: a stand, a gripping device mounted on said stand for movement relative thereto and having two spaced combs mounted thereon, means for feeding the article between said combs, driving means for imparting an alternating movement to said gripping means and combs to form successive transverse folds defining loops in the article, two rotatable driving and pressing rolls mounted on said stand, having a common tangent plane passing through said loops and adapted to drive said loops and press the latter for imparting fold lines to the article, and bearing means supporting at least one of said rolls and connected to said stand and movable relatively thereto for imparting a swinging movement to said one roll with the axis of the roll remaining constantly parallel to said common tangent plane.

2. In a machine as claimed in claim 1, means coupled to and synchronizing the movements of said gripping device and said bearing means.

3. In a machine as claimed in claim 1, said bearing means comprising spaced bearings supporting said one roll, one of said bearings defining a pivot axis for said one roll, said one roll having an axis of rotation intersecting the pivot axis.

4. In a machine as claimed in claim 1, said bearing means comprising spaced bearings supporting said one roll, one of said bearings being movable to accommodate the swinging movement of said one roll, said one roll having a play in at least one of said bearings to permit said swinging movement.

5. In a machine as claimed in claim 1, said bearing means comprising spaced bearings supporting said one roll and a movable support supporting one of the bearings.

6. In a machine as claimed in claim 1, said bearing means comprising spaced bearings supporting said one roll, a movable support supporting one of said bearings, and abutments limiting the movement of said support, one of said abutments being adjustable to control the magnitude of said swinging movement.

7. In a machine as claimed in claim 1, means supporting at least one of said rolls for translatory movement.

8. In a machine as claimed in claim 1, means supporting said one roll for translatory movement.

9. In a machine as claimed in claim 1, means supporting said one roll for translatory and reversible movement.

10. In a machine as claimed in claim 1, means supporting the other of said rolls for swinging movement.

11. In a machine as claimed in claim 1, said bearing means comprising means for moving said one roll upwardly and downwardly and thus away from and towards the other roll.

12. In a machine as claimed in claim 1, control means coupled to said bearing means for controlling the amplitude of the swinging movement of said one roll.

13. In a machine as claimed in claim 1, said bearing means comprising cams controlling the movement of said one roll so that at least one point on the axis of rotation of the latter said roll describes a parallelogram.

14. A machine for pleating a pleatable material comprising means for forming successive loops in the material to initiate the formation of pleats, cylinders operatively disposed with respect to each other and to said means for receiving the looped material, said cylinders having axes normally in a common plane and providing for pressing the loops into pleats, said cylinders defining normal axes of rotation, and support means supporting one of the cylinders for a swinging movement during the pressing of a pleat so that the axis of rotation of said one cylinder is angularly displaced in a direction having a vector transverse to said plane whereby the pleat is urged into and pressed in convergent configuration.

15. A machine as claimed in claim 14 wherein the first said means comprises a gripper for gripping and moving the material and combs operatively associated with the gripper for forming loops in the material; said machine further comprising synchronizing means responsive to the gripper and coupled to said support means for synchronizing the swinging of said one cylinder with the operation of said gripper.

16. A machine as claimed in claim 14 wherein the support means comprises bearings spaced axially of said one cylinder and supporting same, one of the bearings having a substantially fixed position relative to the other cylinder and defining a pivot for the swinging of said one cylinder, the other of said bearings being displaceable to accommodate said swinging.

17. A machine as claimed in claim 16 wherein said one cylinder is supported with play by at least one of the bearings to provide for said swinging.

18. A machine as claimed in claim 16 wherein the support means comprises a support for said other bearing, the support being displaceable relative to said other cylinder to provide for the swinging of said one cylinder, and abutments operatively disposed with respect to said support for limiting displacement of the latter, one of the abutments being adjustable for controlling the magnitude of the swinging of said one cylinder.

19. A machine as claimed in claim 14 wherein the support means supports at least one of the cylinders for translatory movement.

20. In a pleating machine of the type including a drive mechanism for driving therethrough in a normal direction of movement material to be pleated, combs operatively associated with the drive mechanism and reciprocated to move the material and form the pleats, and rolls adjacent said combs for driving and pressing the pleated material, the improvement comprising means angularly moving one of said rolls with respect to the combs in the direction of movement of the material during each pleat forming cycle.

References Cited in the file of this patent

UNITED STATES PATENTS

| | | |
|---|---|---|
| 1,164,790 | De Voe | Dec. 21, 1915 |
| 1,809,716 | McDonough | June 9, 1931 |
| 2,162,591 | Schneider et al. | June 13, 1939 |
| 2,323,896 | Cahill | July 13, 1943 |
| 2,758,760 | Bock et al. | Aug. 14, 1956 |